Jan. 4, 1955  H. BODAN  2,698,682

CONTAINER

Filed Dec. 4, 1950

INVENTOR
HOWARD BODAN

BY
Irving Seidman
ATTORNEY

United States Patent Office 2,698,682
Patented Jan. 4, 1955

2,698,682

CONTAINER

Howard Bodan, Jackson Heights, N. Y.

Application December 4, 1950, Serial No. 199,015

2 Claims. (Cl. 206—1)

This invention relates to a packaging, storing, dispensing and handling device for parts, such as bearings, gears or the like. For the purposes of the following description, bearings will be referred to as the parts to be packaged, stored, dispensed and handled.

Broadly, it is an object of the invention to provide a dustproof container or receptacle for bearings.

Bearings and other precision parts are expensive and should be kept free of dust and other impurities during shipping, storing, handling and dispensing. Since the container is dustproof, such bearings need not be covered with protective grease, but only with a corrosion protective coating, thus preventing the workman's hands from getting greasy while handling any such parts stored. It also avoids the necessity of wrapping the individual bearings and the time which must necessarily be spent in unwrapping such bearings and rewrapping for incoming inspection purposes. In my present container the bearings are always ready to be dispensed for use since they are not wrapped or covered with grease.

It is also an object of this invention to provide a container which is of a length to hold a specific number of bearings, thus avoiding the necessity of counting the same while packaging them. The container may be readily stored so that inventory can be rapidly taken since only the containers need be counted since each container always holds a specific number of such items. Furthermore, during the taking of such inventory, none of the bearings need be handled, thus keeping the same clean and free from dust, grime or grease.

A further object is to provide a container which will facilitate the dispensing and handling of the bearings so that a workman will lose no time in obtaining the proper size of bearing required for use at the time required and with a minimum of handling.

A further object is to provide a ready method for shipment, handling and sale since the containers may be returned by the purchaser for credit just like bottles of various kinds in other industries.

A further object of the invention is to provide a guide rod for extending the length of the cylinder in order to retain the bearings in stacked position within the container.

For certain types of parts the guide rod can be omitted and the inside diameter of the container becomes the guide.

A still further object of the invention is to provide a packaging, storing, dispensing and handling device of simple and practical construction which is easily handled and relatively inexpensive to manufacture.

Still another object of the invention is to provide a method of packaging precision parts such as bearings, gears and the like therein in a dustproof and moistureproof container and dispensing the same as and when required.

For a fuller understanding of the nature and objects of the invention, reference is had to the following detailed description in connection with the accompanying drawings, in which.

Figure 1:
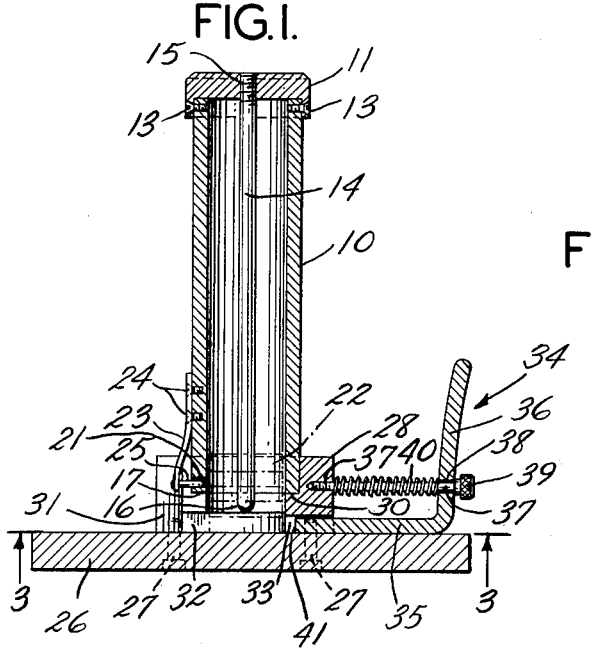
Fig. 1 is a vertical sectional view taken through line 1—1 of Fig. 2.

Referring to the drawing, numeral 10 designates a transparent hollow cylinder, preferably made of transparent plastic. However, cylinder 10 may also be made of glass, metal, or other like material and may also be translucent or opaque depending upon the article to be stored or dispensed. A top cover 11 having a recess 12 therein is adapted to be seated to close one end of the cylinder 10. Screws 13 hold cover 11 firmly in position upon the cylinder 10. A guide rod 14 is centrally fixed at right angles to cover 11 by its threaded end 15 so that when cover 11 is placed upon cylinder 10, the rod 14 will be concentrically positioned in the cylinder 10 to guide the bearings 22 into stacked position when filling the cylinder with bearings and dispensing the said bearings from the cylinder. The opposite or rounded end 16 of rod 14 extends slightly above or below (depending upon which way the cylinder is held) the lower or opposite end 17 of the cylinder 10 as best shown in Fig. 1 to facilitate loading the cylinder 10. The rod 14 extends into the central opening 18 of bottom cap 19 so that the rod 14 will remain in raised and central position in the cylinder 10, thus preventing vibration of the bearings within the cylinder. Bottom cap 19 is hollow and has a right angle keyway 20. Its wall end coacts with a pin adjacent the end of the cylinder to hold the cap 19 firmly upon the cylinder 10.

A leaf spring 23 is attached to the outside of the cylinder 10 by screws 24 and is bent outwardly so that a pin 25 carried at its end and projecting inwardly is normally in the position shown in Fig. 1, that is, the end of the pin 25 does not project into the inside of cylinder 10. Pin 25 passes through a hole 21 adjacent the lower end 17 of the cylinder 10. The purpose of pin 25 will be hereinafter described.

A base 26 having a smooth top which may be made of steel, plastic, resin-bonded fibre and like material has attached upon its upper central surface by screws 27 a receptacle 28 which has a central U-shaped recess 29 to receive the cylinder 10. A shoulder 30 in the receptacle 28 provides a seat for the lower end 17 of cylinder 10 and thus provides a restricted opening at its lower end which is the same in diameter as the inside diameter of the cylinder 10. Shoulder 30 is of a height above the upper surface of base 26, so that the lower end 16 of the rod 14 is slightly higher from the upper surface of base 26 than the thickness of bearing 22. The front of receptacle 28 is angularly cut as shown at 31 and has a front opening 32 of the same width as the inside diameter of cylinder 10 to permit the bearings 22 to be dispensed therethrough. At the opposite side of the opening 32 in receptacle 28 is a channel 33 of a height slightly less than the height of the bearings 22.

Figure 3:
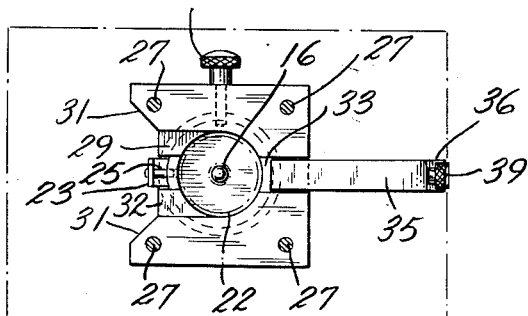
Fig. 3 is a view taken along the line 3—3 of Fig. 1.

A plunger 34, having a horizontal leg 35 and an upright fingerpiece 36, is slidably attached to receptacle 28 by a long pin 37 which is screwed into receptacle 28 opposite the front opening 32 as shown in Fig. 1. Pin 37 passes through a hole 38 in the fingerpiece 36 and has a knurled head 39 at its outer end which acts as a stop for the plunger 34. A spring 40 is seated between receptacle 28 and fingerpiece 36 to permit the plunger 34 to be moved inwardly against spring pressure. The leg 35 is adapted to slidably move horizontally through channel 33 to discharge or dispense the bearings 22 singly upon each inward movement of the plunger 34. The end 41 of the horizontal leg 35 normally lies within the receptacle 28 as shown in Figs. 1 and 3 and may be tipped with rubber, flexible plastic or like material if desired to cushion the contact against the bearings when the plunger 34 is moved inwardly.

Figure 4:
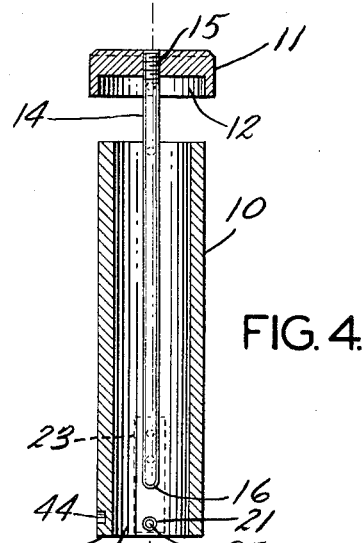
Fig. 4 is an exploded vertical sectional view of the container and showing one of the bearings between the cylinder and the bottom cap.

In use, the cylinder 10 is held in the reverse position than that shown in Fig. 4 and is loaded with bearings 22 through lower opening 42 by sliding bearings 22 down the guide rod 14. Of course, top cover 11 is seated upon cylinder 10 during this process. As hereinbefore stated, the height of the cylinder 10 between the top cover 11 and the pin 25 determines the number of bearings of predetermined size which the cylinder 10 will hold so that the bearings need not be counted when filling the cylinder. When the cylinder 10 is full, that is, when the last bearing reaches the pin 25, a spacer (not shown) may be inserted upon the last bearing to prevent movement of the bearing during shipping and handling of the cylinder. The bottom cap 19 is then attached to the cylinder which becomes a dustproof container for the shipping, storing and dispensing of the bearings. Since the cylinder and the container is dustproof, the bearings need not be greased so that a workman handling such bearings can keep his hands free of grease. It is also needless to wrap each bearing as is now known in the industry so that the bearings are always ready for use and time is thus saved since the workman need not unwrap any of the bearings.

Figure 2:
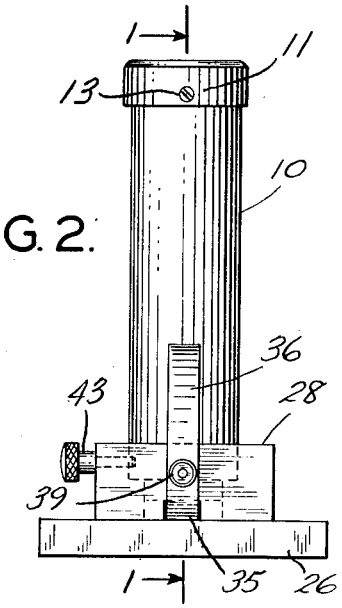
Fig. 2 is a rear elevational view of the container and dispenser.

When it is desired to use the bearings within the cylinder, the cylinder 10 is held so that cap 19 is uppermost and the cap 19 is then removed. The spacer is also removed and discarded and the spring 23 is then depressed with the thumb, causing pin 25 to enter the inside of the cylinder 10 above the uppermost bearing of the stack of bearings against discharge from the cylinder. The cylinder 10 is then inverted as shown in Figs. 1 and 2 and is seated within the recess 29 upon shoulder 30. In order to hold the cylinder firmly in the recess 29, thumbscrew 43 is caused to engage a small recess 44 in the lower end of the cylinder 10 as seen in Fig. 4, the stack of bearings dropped to the upper surface of the base 26 with the lowermost bearing ready to be dispensed. When it is desired to remove a bearing from the cylinder, the plunger 34 is manually moved inwardly, causing the end 41 of leg 35 to move the lowermost bearing through the front opening 32 onto the outer top surface of base 26. The stack of bearings slide the height of bearings so removed and the next bearing is ready for dispensing. When the last bearing has been removed from the cylinder, the bottom cap 19 is replaced and the entire cylinder may be returned to the bearing manufacturer for credit. Thus each cylinder may be used for a long period of time. Since the walls of cylinder 10 are transparent or translucent, as that is the type of cylinder used for bearings, gears or similar articles, the number of such items remaining within the cylinder are always visible to the workman.

If desired, a cover member (not shown) may be inserted between the angular cuts 31, closing the front opening 32 to prevent any dust from entering the cylinder during any period that the bearings are not being dispensed.

Of course, the plunger 34 may be actuated by other well known means, by electrical or mechanical attachments instead of manual movement without departing from the spirit of the invention.

It is also obvious that various changes and modifications may be made in the details of construction and arrangement of parts without departing from the general spirit of the invention.

I claim:

1. A dustproof device for parts having a central opening, said device comprising a hollow cylinder adapted to receive said parts in stacked formation, a top cap for closing one end of said cylinder, said cap having a centrally attached guide rod at right angles to said cap and running concentrically through said cylinder, said guide rod projecting beyond the lower end of said cylinder, a hole in said cylinder adjacent the lower edge of said cylinder, a leaf spring attached to said cylinder and bent outwardly, a pin attached to the end of said leaf spring projecting inwardly and movably positioned within said hole, said pin adapted to hold said stack of parts to be dispensed within said cylinder when said spring is depressed, the end of said pin normally lying within the wall of said cylinder.

2. A dustproof storing and shipping device for parts having a central opening, said device comprising a transparent hollow cylinder adapted to receive said parts in stacked formation, top and bottom removable caps for closing the ends of said cylinder, said top cap having a centrally firmly attached guide rod extending concentrically through said cylinder, said bottom cap having a hole in its center, said guide rod having its free end projecting beyond the opposite end of said cylinder through said hole in said bottom cap for centrally retaining said parts within said cylinder, said cylinder having a keyway pin projecting outwardly adjacent its lower end, a keyway in said bottom cap cooperating with said keyway pin for firmly locking said bottom cap on said cylinder, a hole in said cylinder adjacent its lower end, a leaf spring having one end attached to the outer wall of said cylinder and having an inwardly projecting pin attached to its end, said pin movably positioned within said hole and adapted to hold said stack of parts to be dispensed within said cylinder when said spring is depressed.

References Cited in the file of this patent

UNITED STATES PATENTS

| 18,035 | Borrman | Aug. 25, 1857 |
| 364,261 | Kinney et al. | June 7, 1887 |
| 856,945 | Dove | June 11, 1907 |
| 1,485,716 | Rogers | Mar. 4, 1924 |
| 1,625,242 | Chandler | Apr. 19, 1927 |
| 2,203,494 | Greenhill | June 4, 1940 |
| 2,215,850 | Holdeman | Sept. 24, 1940 |

FOREIGN PATENTS

| 338,198 | Great Britain | Nov. 17, 1930 |